United States Patent
Leis et al.

(10) Patent No.: US 7,523,343 B2
(45) Date of Patent: Apr. 21, 2009

(54) REAL-TIME FILE SYSTEM REPAIRS

(75) Inventors: Benjamin A. Leis, Seattle, WA (US); Brian D. Andrew, Redmond, WA (US); Daniel W. H. Chan, Redmond, WA (US); Mark J. Zbikowski, Woodinville, WA (US); Vishal V. Ghotge, Bellevue, WA (US); Thomas J. Miller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 10/954,664

(22) Filed: Sep. 30, 2004

(65) Prior Publication Data

US 2005/0246612 A1 Nov. 3, 2005

Related U.S. Application Data

(60) Provisional application No. 60/566,662, filed on Apr. 30, 2004.

(51) Int. Cl.
    G06F 11/00 (2006.01)
(52) U.S. Cl. ......................................................... 714/5
(58) Field of Classification Search ...................... 714/5
     See application file for complete search history.

(56) References Cited

U.S. PATENT DOCUMENTS

| | | | |
|---|---|---|---|
| 5,305,455 A * | 4/1994 | Anschuetz et al. ......... | 718/100 |
| 5,432,933 A * | 7/1995 | Janicek ....................... | 718/100 |
| 5,765,151 A * | 6/1998 | Senator ......................... | 707/8 |
| 5,875,444 A | 2/1999 | Hughes | |
| 6,014,515 A * | 1/2000 | Burch ......................... | 717/129 |
| 6,640,317 B1 | 10/2003 | Snow | |
| 6,816,984 B1 * | 11/2004 | Snyder et al. ................. | 714/38 |
| 6,934,939 B2 * | 8/2005 | Ewart et al. ................. | 717/152 |
| 6,983,362 B1 * | 1/2006 | Kidder et al. .................. | 713/1 |
| 7,085,943 B2 * | 8/2006 | Chun et al. .................. | 713/300 |
| 2003/0115509 A1 * | 6/2003 | Dubal ......................... | 714/46 |
| 2004/0128658 A1 * | 7/2004 | Lueh et al. .................. | 717/151 |
| 2005/0097141 A1 * | 5/2005 | Loafman et al. ............ | 707/200 |

OTHER PUBLICATIONS

NN86023738 "Automated Link Analysis for Displaywriter", IBM Technical Disclosure Bulletin, Feb. 1986, US, vol. 28, Iss 9, pp. 3738-3741.*

* cited by examiner

Primary Examiner—Gabriel L Chu
(74) Attorney, Agent, or Firm—Lee & Hayes, PLLC

(57) ABSTRACT

A file system enables the real-time correction of detected corruptions to on-disk data. An enhancement to a file system responds in real time to file system corruptions detected on a running volume, and repairs the corruptions at the point where the file system detects them. Upon detection of a corruption by the file system, the system enhancement records information describing the nature of the corruption. A repair scan is defined for each type of corruption encountered. Repair scans can be run at the top level of execution in the current thread in which the corruption is detected, or they may require a dedicated thread to service the repair operation.

24 Claims, 5 Drawing Sheets

REAL-TIME FILE SYSTEM REPAIRS

RELATED CASES

This application claims priority to U.S. Provisional Application No. 60/566,662, filed Apr. 30, 2004.

TECHNICAL FIELD

The present disclosure generally relates to file systems, and more particularly to a file system that supports the real-time correction of detected corruptions on a running volume.

BACKGROUND

A file system in a computer specifies the way data files are stored on a storage volume of the computer (e.g., a hard disk), and how the files are retrieved from that volume. For example, Windows, OS/2, Macintosh, and UNIX-based operating systems have file systems that use a hierarchical or tree structure for maintaining files. File systems also specify conventions for naming files, such as how many characters can be used in a file name, which characters can be used in a file name, and how many characters are allowed in the suffix of a file name.

The term "file system" is often used to refer to the file system driver, program, or part of the operating system that manages the file system structure, conventions, and related tasks. Thus, the file system performs file operations such as opening, reading, writing, renaming, and closing files in response to different user/application requests. One significant aspect of managing file system transactions is maintaining internal integrity within the file system. In general, the file system expects data structures on a hard disk (i.e., the storage volume) to be consistent and in keeping with the general file system format. For example, when data is written to the disk in a particular format, the file system expects that the data should be able to be read back from the disk in the same format. However, there are various circumstances that can cause corruption of the data on the disk. A problem with the disk (i.e., the physical storage media) may result in dropped data bits, for example. There may be a connectivity problem between the computer and the hard disk that results in data not being written correctly to the disk or read back correctly from the disk. There may be a programming bug in the operating system or a driver that results in data being written to random locations in memory. Thus, various problems with data transactions and other issues can cause corruption of a file system's data structures.

File systems typically employ a process to check for and fix corruptions caused by incorrect or incomplete transactions. For example, the NTFS (New Technology File System) file system, used by various Windows® brand operating systems from Microsoft® Corporation of Redmond, Wash., employs a Autochk/Chkdsk utility that scans the volume to make sure the data structures are consistent and that no corruptions exist. The Autochk/Chkdsk utility is run on NTFS volumes each time they are mounted on the system, which most commonly occurs when the system is booted or rebooted. When NTFS discovers a corruption problem on a running volume, it marks the volume as 'dirty' and presents the user with a corruption error. Upon reboot of the system, then, if NTFS encounters a 'dirty' volume or other inconsistency, Autochk/Chkdsk is automatically executed and the boot request to mount the volume is delayed or declined. The Chkdsk utility can also be initiated manually, for example, by a system administrator of a larger computer system who wants to control the times when the utility runs. While Chkdsk runs against the volume (i.e., scans the volume for repair), users cannot access the volume. Depending on the types of corruptions found, Chkdsk may take specific corrective actions to repair the corruptions. For example, if there is inconsistent or corrupt information on a disk that is supposed to indicate where a file is allocated, Chkdsk will delete the file. If there is an unreadable or corrupt file directory, Chkdsk will rebuild the directory.

Although such file system recovery utilities (e.g., Chkdsk) are generally successful at repairing file system corruptions, they have disadvantages. One disadvantage is that they can be disruptive to users, as noted above. Chkdsk can take a long time to run, and it requires exclusive access to the volume (e.g., hard disk) it is scanning and repairing. Therefore, upon booting up a computer, a user may not have access to the volume(s), but instead must wait until Autochk/Chkdsk finishes its repairs before the boot process can be completed. On a large server, servicing an enterprise system for example, the time it takes autochk/Chkdsk to run can be significant. Large servers can have millions of files that may take many hours (e.g., 10-15 hours) to process with autochk/Chkdsk. Thus, many users can be inconvenienced if an administrator is not careful about the time of day that the autochk/Chkdsk utility is executed.

Accordingly, a need exists for a way to repair file system corruptions on a volume without disrupting or preventing access to the volume.

SUMMARY

A system and methods enable real-time correction of file system corruptions. An enhancement to a file system responds in real time to file system corruptions detected on a running volume, and repairs the corruptions at the point where the file system detects them without locking the whole volume so that other operations on the volume can continue. Upon detection of a corruption by the file system, the system enhancement records information describing the nature of the corruption. A repair scan is defined for each type of corruption encountered. Repairs may occur synchronously or asynchronously to the user request that detected the corruption, depending on its complexity. In the latter case the application will be informed of the ongoing repair.

BRIEF DESCRIPTION OF THE DRAWINGS

The same reference numerals are used throughout the drawings to reference like components and features.

DETAILED DESCRIPTION

Introduction

The following discussion is directed to an enhanced file system and methods that provide for the real-time and online repair of corruptions detected on a running volume. The file system is self-correcting in that it detects corruptions, determines appropriate repairs for correcting the corruptions, and implements the repairs, while continuing to manage file system operations in a largely uninterrupted manner. The volume remains online and active during the repair operations.

Advantages of the enhanced file system include reduced disruptions to computer users because corruptions are repaired as they arise, rather than being repaired all at once by a repair utility that runs at boot time or at a specific time set by an administrator.

Exemplary Computing Environment

Figure 1:
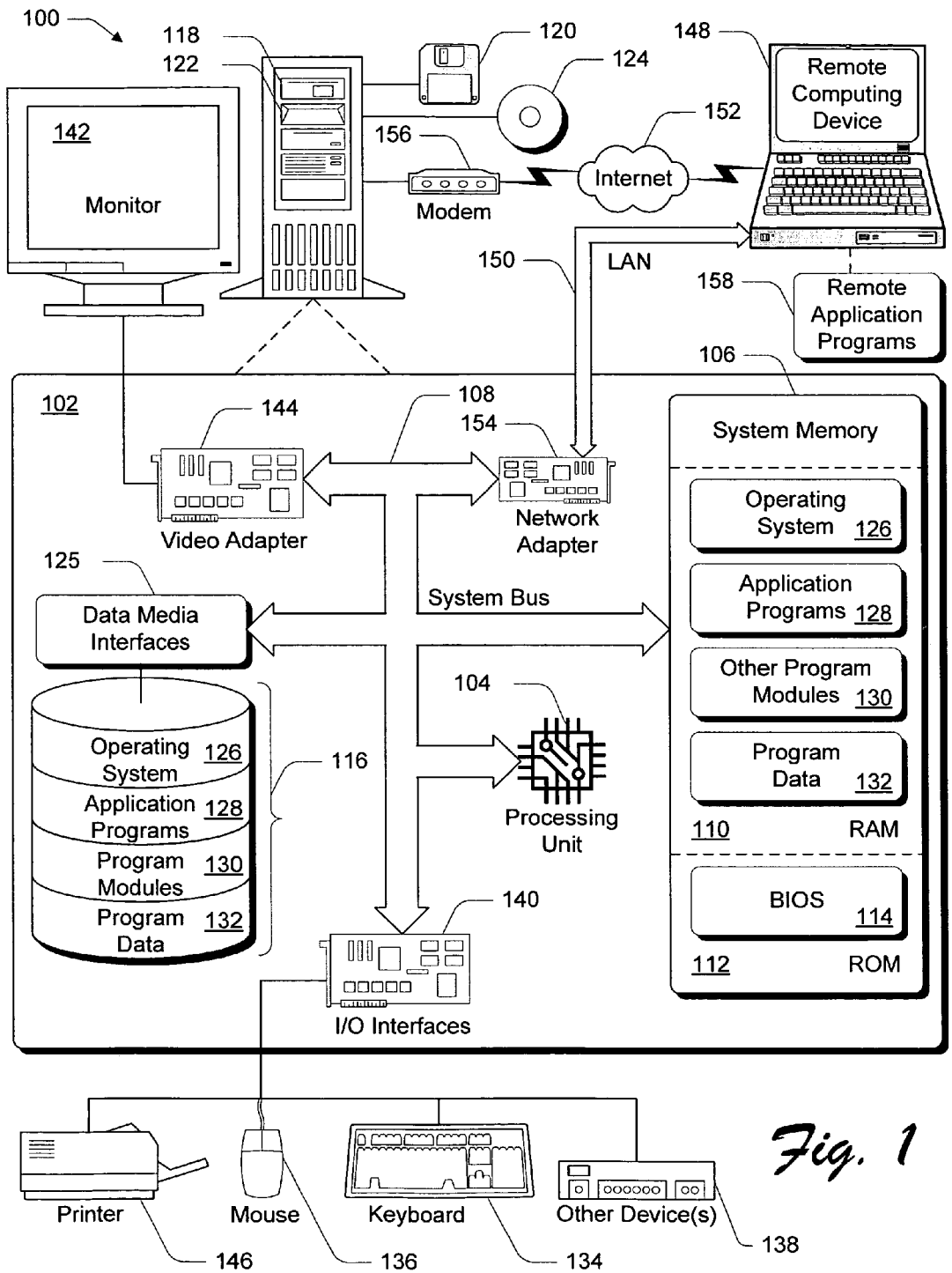
FIG. 1 illustrates an exemplary computing environment suitable for implementing an enhanced file system that provides for the real-time and online repair of corruptions detected on a running volume.

FIG. 1 illustrates an exemplary computing environment suitable for implementing an enhanced file system that provides for the real-time and online repair of corruptions detected on a running volume. Although one specific configuration is shown in FIG. 1, such computing devices may be implemented in other computing configurations.

The computing environment 100 includes a general-purpose computing system in the form of a computer 102. The components of computer 102 may include, but are not limited to, one or more processors or processing units 104, a system memory 106, and a system bus 108 that couples various system components including the processor 104 to the system memory 106.

The system bus 108 represents one or more of any of several types of bus structures, including a memory bus or memory controller, a peripheral bus, an accelerated graphics port, and a processor or local bus using any of a variety of bus architectures. An example of a system bus 108 would be a Peripheral Component Interconnects (PCI) bus, also known as a Mezzanine bus.

Computer 102 includes a variety of computer-readable media. Such media can be any available media that is accessible by computer 102 and includes both volatile and non-volatile media, removable and non-removable media. The system memory 106 includes computer readable media in the form of volatile memory, such as random access memory (RAM) 110, and/or non-volatile memory, such as read only memory (ROM) 112. A basic input/output system (BIOS) 114, containing the basic routines that help to transfer information between elements within computer 102, such as during start-up, is stored in ROM 112. RAM 110 contains data and/or program modules that are immediately accessible to and/or presently operated on by the processing unit 104.

Computer 102 may also include other removable/non-removable, volatile/non-volatile computer storage media. By way of example, FIG. 1 illustrates a hard disk drive 116 for reading from and writing to a non-removable, non-volatile magnetic media (not shown), a magnetic disk drive 118 for reading from and writing to a removable, non-volatile magnetic disk 120 (e.g., a "floppy disk"), and an optical disk drive 122 for reading from and/or writing to a removable, non-volatile optical disk 124 such as a CD-ROM, DVD-ROM, or other optical media. The hard disk drive 116, magnetic disk drive 118, and optical disk drive 122 are each connected to the system bus 108 by one or more data media interfaces 125. Alternatively, the hard disk drive 116, magnetic disk drive 118, and optical disk drive 122 may be connected to the system bus 108 by a SCSI interface (not shown).

The disk drives and their associated computer-readable media provide non-volatile storage of computer readable instructions, data structures, program modules, and other data for computer 102. Although the example illustrates a hard disk 116, a removable magnetic disk 120, and a removable optical disk 124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 116, magnetic disk 120, optical disk 124, ROM 112, and/or RAM 110, including by way of example, an operating system 126, one or more application programs 128, other program modules 130, and program data 132. Each of such operating system 126, one or more application programs 128, other program modules 130, and program data 132 (or some combination thereof) may include an embodiment of a caching scheme for user network access information.

Computer 102 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 102 via input devices such as a keyboard 134 and a pointing device 136 (e.g., a "mouse"). Other input devices 138 (not shown specifically) may include a microphone, joystick, game pad, satellite dish, serial port, scanner, and/or the like. These and other input devices are connected to the processing unit 104 via input/output interfaces 140 that are coupled to the system bus 108, but may be connected by other interface and bus structures, such as a parallel port, game port, or a universal serial bus (USB).

A monitor 142 or other type of display device may also be connected to the system bus 108 via an interface, such as a video adapter 144. In addition to the monitor 142, other output peripheral devices may include components such as speakers (not shown) and a printer 146 which can be connected to computer 102 via the input/output interfaces 140.

Computer 102 may operate in a networked environment using logical connections to one or more remote computers, such as a remote computing device 148. By way of example, the remote computing device 148 can be a personal computer, portable computer, a server, a router, a network computer, a peer device or other common network node, and the like. The remote computing device 148 is illustrated as a portable computer that may include many or all of the elements and features described herein relative to computer system 102.

Logical connections between computer 102 and the remote computer 148 are depicted as a local area network (LAN) 150 and a general wide area network (WAN) 152. Such networking environments are commonplace in offices, enterprise-wide computer networks, intranets, and the Internet. When implemented in a LAN networking environment, the computer 102 is connected to a local network 150 via a network interface or adapter 154. When implemented in a WAN networking environment, the computer 102 includes a modem 156 or other means for establishing communications over the wide network 152. The modem 156, which can be internal or external to computer 102, can be connected to the system bus 108 via the input/output interfaces 140 or other appropriate mechanisms. It is to be appreciated that the illustrated network connections are exemplary and that other means of establishing communication link(s) between the computers 102 and 148 can be employed.

In a networked environment, such as that illustrated with computing environment 100, program modules depicted relative to the computer 102, or portions thereof, may be stored in a remote memory storage device. By way of example, remote application programs 158 reside on a memory device of remote computer 148. For purposes of illustration, application programs and other executable program components, such as the operating system, are illustrated herein as discrete blocks, although it is recognized that such programs and components reside at various times in different storage components of the computer system 102, and are executed by the data processor(s) of the computer.

Exemplary Embodiments

Figure 2:
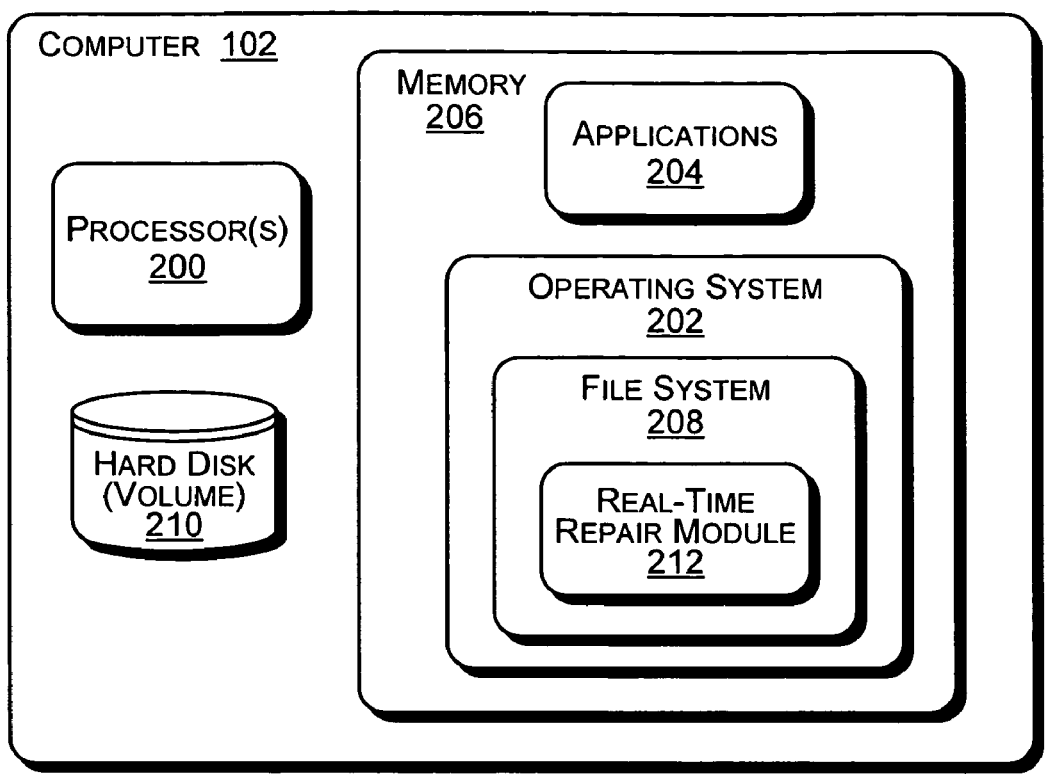
FIG. 2 illustrates an exemplary embodiment of a computer configured for implementing an enhanced file system that provides for the real-time and online repair of corruptions detected on a running volume.

FIG. 2 illustrates an exemplary embodiment of a computer 102 configured for implementing an enhanced file system that provides for the real-time and online repair of corruptions detected on a running volume. Computer 102 includes one or more processors 200 configured to execute an operating system 202 and various application programs 204 stored in a memory 206. As used throughout this disclosure, the term volume is generally intended to refer to an identifiable unit of data storage. Thus, a volume may be one of several separately identifiable volumes on a physical storage unit such as a hard disk 210.

A file system driver 208 (hereinafter referred to as file system 208) is also stored in memory 206 of computer 102. In general, a file system, or file management system, is a structure or convention for storing files on a volume 210 (e.g., a hard disk) in a computer 102, such as a hierarchical system in which directories have files and subdirectories beneath them. Thus, a file management system specifies the way data files are stored on a hard disk in the computer, how the files are retrieved from the volume, conventions for naming the files, and so on. The term "file system" is often used to refer to the file system driver, program, or part of the operating system that supports or manages the file management system. A file system driver interprets the on-disk format to manage the file system structure and conventions, and to perform file operations such as opening, reading, writing, renaming, and closing files in response to various user/application requests. It is this context in which the file system driver/code 208 stored in memory 206 is discussed throughout this disclosure. That is, file system 208 is intended to refer to the program or part of the operating system (i.e., executable code) that supports and manages the more general file management system as discussed above.

Accordingly, file system 208 is configured to perform various operations associated with the management of files on one or more volumes of hard disk 210 within computer 102. For example, file system 208 performs file transactions such as opening, reading, writing, renaming, and closing files in response to different user/application requests. File system 208 is typically integrated with operating system 202 as illustrated in FIG. 2. However, file system 208 is not limited to being an integral part of operating system 202, but may also be a stand-alone application or program module. Furthermore, although memory 206 and hard disk 210 are illustrated separately in FIG. 2, it is noted that memory 206 may be partly or completely a part of hard disk 210. The hard disk 210 and memory 206 are illustrated separately in FIG. 2 for the purpose of discussion only. Thus, while the operating system 202 and various application programs 204 are illustrated as being stored in memory 206, it may be that they are stored on one or more volumes of hard disk 210.

In the present embodiment, file system 208 is discussed in terms of being the NTFS (New Technology File System) file system, used by various Windows® brand operating systems from Microsoft® Corporation of Redmond, Wash. However, use of NTFS as an exemplary file system is not intended as a limitation as to other file systems and operating systems to which the described file system enhancement may be applicable. Thus, the file system enhancement for real-time file system repairs described herein may be applicable to different file systems used in various operating systems, such as, for example, OS/2, Macintosh, and UNIX-based operating systems.

As noted above, one significant aspect of managing file system transactions is maintaining internal integrity within the file management system. Data corruptions on a volume of disk 210 can be caused by various problems such as a physical anomaly on disk 210, a connectivity problem between the computer 102 and the hard disk 210, or a programming bug in the operating system or a driver that results in data being written to random locations in memory.

A real-time repair module 212 is configured as part of file system 208 to help maintain the integrity of the file management system of computer 102. Real-time repair module 212 is generally configured to provide for the real-time and online repair of corruptions detected by the file system 208. The remainder of this section of the disclosure describes the operation of the real-time repair module 212 in conjunction within file system 208 in response to corruptions detected on the volume in the running system, and outlines the basic procedure for detection, scheduling, reporting and managing the repair process. Additional details of each of these topics are covered a later section titled Appendix.

Real-time repair module 212 is configured to respond at current code points where the file system 208 raises a corrupt status indication/error. At that time, file system 208 will record as much information as needed to initiate the repair procedure for the specific failure. The repair scan may be performed back at the top level of execution in the current thread. However more complex repair scans may require a dedicated thread.

Many repairs are compatible with all the users currently manipulating a file in the running system and therefore can be repaired completely transparently. Where repairs are incompatible with users manipulating a file in the running system, the users may see side effects related to the repairs. For example, real-time repair module 212 may truncate a stream to zero length while there are still valid handles which access this same stream. Such a file system repair is compatible for handles that share with writers, but is incompatible otherwise. Incompatible handles must be invalidated, and future operations on incompatible handles will fail.

A top-level request to the file system 208 that cannot be completed due to some form of corruption may be failed with an error status or it may be blocked until a short-term repair is completed. A corruption detected with respect to a current file system request may be initially detected in the current request itself, or it may already have been detected as a result of an earlier detection related to a previous request and be in the process of being repaired. In either respect, a level of repair complexity is defined that indicates an appropriate corrective action that should be taken.

The file system 208 and repair module 212 give priority to the repair operations scheduled in response to corruption detections. This simplifies designing future features by reducing dependencies between components.

In detecting corruptions, file system 208 verifies meta-data as it is read and processed from the hard disk 210. File system 208 detects meta-data corruptions directly, and raises an error status indicating each corruption. At the point a corruption is detected, the file system 208 and repair module 212 determine the scope of the repair needed and note this in the top level file system context structure in the current thread. Typically the file system 208 is already holding locks on the meta-data stream with the corruption and can set necessary state information on the relevant data structures to indicate they were in an invalid state or being repaired. This allows repair module 212 to synchronize the repair operation with outstanding and future requests on these same files.

The file system 208 and repair module 212 also handle corruptions due to failures in other components. The two principal causes of such corruptions are data loss in the log file and failed file system transaction aborts. The log file failures typically occur at volume restart time. A corrupt status is raised, and the file system 208 fails to mount the volume (e.g., disk 210). Repair module 212 capture this error and causes a re-initialization of the log file. The file system 208 may choose to ignore the possible volume corruption at this point and depend on the normal mechanism of detecting the corruption in the running system.

Real-time repair module 212 performs repairs through a single routine that processes a list of detected corruptions and has a list of file system user requests waiting for completion of the repairs. Complex repair scans may require a dedicated thread to service a repair operation. A dedicated thread would be spawned only as needed and it would call the same common repair routine. Small scale repair routines run inline at the top-level point of execution in the stack. They typically handle a repair queue of length one and a pending IRP queue of length one. This allows multiple repairs to occur in parallel. In the event one of these local repair operations hits a cascading or more complex corruption, then the local work queue and IRP queue can be migrated to the global work queue. This may also cause other local repair operations to be aborted and transferred to the global work queue.

Corruptions may be detected within a recursive file system request. In this case, the file system 208 unwinds to the top level request in order to perform the repair. This insures that no resources are held by a caller into the file system 208 while the repair is being performed. If the file system 208 is unable to return to a top level where no resources are held, then it posts the repair to a work queue and fails the request in the current thread. In any case, all of the recursive file system requests will need to be failed with a corrupt status error. This can impact file system filters which may initiate requests within the context of a different request.

In some cases, the file system 208 will be unable to mount a volume (e.g., disk 210) due to either a corrupted boot sector or a disconnect in the MFT (master file table) file. Where there is a corrupted boot sector, there is no certainty as to which file system actually "owns" the volume. Therefore, the file system 208 cannot take unilateral action to scan the disk 210 to rebuild the meta-data and repair the boot sector. This is because there may be residual file system meta-data on the volume, but the volume may have been quick formatted to a different file system. Under these circumstances, an off-line tool needs to be run by an administrator which can force the volume to be treated as a particular file system volume, such as an NTFS volume. Such an off-line tool can scan the volume, rebuilding the boot sector. Once the boot sector is in place, then the file system 208 can do its own volume scan to rebuild the rest of the file system meta-data. This full scan will complete the repair process of the corrupted boot sector problem, and it also handles the problem of a disconnect in the MFT file.

The file system 208 (in conjunction with the real-time repair module 212) records key information describing the nature of corruption encountered at the time it detects the corruption. The file system 208 and repair module 212 define a series of repair scans that correspond to the types of corruptions detected. A work item is generated that corresponds to a defined repair scan at the time of a corruption detection. Certain complex repair scans are a collection of lower level scans plus additional checks. Completing a complex repair scan that is a collection of lower level scans guarantees the correctness of the lower level scans (doing a file check guarantees that the attributes are correct). Other repair scans are hierarchical in that a currently running scan may depend on the correctness of other file system meta-data before it can run successfully (e.g., a rebuild of a directory can block the file name check of a file contained in the directory).

The file system 208 maintains the relationship between work items generated during corruption detection and repairs that are currently in-progress and repairs that are pending. Repair scans that are contained within more complex scans will be folded into the more complex scan. When the complex scan completes, then each of the component scans are considered to have been completed. Hierarchical repair scans are triggered when the scan they depend on has completed. In order to maintain these relationships, the file system 208 supports aborting a repair scan which is in progress in order to perform the higher priority scans above.

Some examples of repair scans include:
Attribute scan
File scan
Index scan
Volume bitmap rebuild
Security descriptor file scan File system 208 with real-time repair module 212 also deals with the case where additional corruption is encountered while performing a repair scan. In order to maintain a clean architectural model, the relationship between a current repair scan and the type of corruption encountered is fit into one of the two types of related repair scans described above. The current repair scan is either folded into the repair of a containing meta-data object (i.e., additional file corruption detected while repairing an attribute), or it is postponed until a new repair scan is completed (i.e., directory verification postponed until the file record of a file within the directory is repaired). This requires a careful definition of the individual work items so that any possible corruption encountered while doing a repair can be scheduled and fixed without any dependency on the original repair.

The file system 208 with real-time repair module 212 performs repairs with minimal impact on applications in the running system and provides full reporting on the nature of the changes made during repairs. However, client applications 204 may be impacted due to the repair of file system corruptions, depending on the severity of the repair and the modes of the open handles. If the repair is quick, then any top level IRP generated by the application will be made to wait while the repair is underway. In such cases, repair operations should be transparent to the application 204. If the repair is non-trivial, however, then the application request to the file system 208 may fail with a corrupt status error.

Applications 204 will need to manage the result of a repair operation, including repair to the executables which comprise the application 204, as well as any data files in use. If possible, the file system 208 will report the changes through USN and notification events. If the changes are compatible with the current access and share mode of the file, then the application 204 should be able to proceed without incident. However, if the repair is not compatible with the application 204, then the application 204 will receive an invalid handle status error. Applications 204 will need to manage cases where their handles can no longer be used to access the file. In general, the file system 208 and repair module 212, files can be made accessible without a dismount and repair.

File system 208 does not attempt to note on-disk, every corruption currently being repaired or queued for repair. Since the file system 208 should encounter and repair the corruptions again in the running system, there is little benefit in developing a complex on-disk representation that must guarantee that all corruptions are preserved. There is a benefit, however, in noting a long running scan is in progress and the point reached last in the running system. The file system 208 may put this information on disk 210 in a volume file record. It is not possible to guarantee that this data is correct on disk, however, as it is also subject to being corrupted itself. File system 208 may also be in the process of repairing the volume file record in the running system, and so may not be able to write to this record at the time.

File system 208 uses a status file corrupt error code and a status disk corrupt error code to indicate when a current operation is failing because of some corruption related error. There are three classes of failures that could fail with these status codes:

Corruption encountered while performing the operation— non-trivial repair required;

User operation requires long-running repair to complete;

Handle now invalid due to repair work—file system repaired the file in some way which is incompatible with the sharing mode, desired access, file locks held or oplocks held on the file.

File system 208 also provides functionality to allow authorized users to interact with the repair process. System administrators are able to initiate a validation scan on file system meta-data. File system 208 provides flexibility so that the administrator can specify the scope of the validation. This can include the following:

Full volume scan
Security scan
File Scan
Stream Scan
Directory Scan
View Index Scan File system 208 also provides a mechanism to report the current complex repair operation and progress status. It is not necessary to report any information about minor repair operations as the user should never see a file system request fail because of the existence of the corruption. Note that a minor repair can invalidate open handles, however.

File system 208 also provides a notification mechanism that can block behind a repair operation. A system administrator can use a volume handle to wait on any complex repair or verification scan underway. In order to make this work, file system 208 does not fail a volume open due to corruption. Users who get a status corrupt error on that handle can use that handle to wait for the repair to complete on that handle.

Volume dismount is not significantly blocked if a repair is underway. Any short term repairs can be completed. A long-running repair scan may need to be reinitiated by a user. Repair to other minor errors which are in the repair queue will be cancelled and retried as they are discovered during the next volume mount.

File system 208 with real-time repair module 212 may be either IO, CPU or memory intensive, as it scans through the volume performing repair operations. This overhead may be unacceptable in some critical environments. In such cases file systems 208 provides a method to disable automatic repair for long running scans and requires an administrator to initiate the scan directly. Unilateral short-lived repair operations will still be Initiated by the file system 208.

File system 208 with real-time repair module 212 may encounter repeated or intermittent hardware errors while performing repairs. Intermittent errors can make repair impossible. In this case, file system 208 (repair module 212) fails to do the repair and leaves the volume in a corrupt state. If possible, the file system 208 notes this in the event log with the intent that the user should address the hardware issues. In the case of repeatable errors, the file system 208 retires the clusters to the bad cluster file and treats the data as lost.

File system 208 with real-time repair module 212 may also see errors due to the state of the running system. The principal source of errors would be insufficient pool memory to perform some operation. In this case, file system 208 notes the failure in the event log if possible, and terminates the repair. The repair is attempted again at some point in the future when the corruption is encountered again.

Exemplary Methods

Example methods for implementing an enhanced file system that provides for the real-time and online repair of corruptions detected on a running volume will now be described with primary reference to the flow diagrams of FIGS. 3-5. The methods apply generally to the exemplary embodiments discussed above with respect to FIGS. 1 and 2. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 302 of method 300, a corruption is detected with respect to data on a storage volume. The file system 208 detects the corruption. The corruption may be detected during or with respect to a current file system request, or it may have been detected during a previous file system request. The file system 208 records information describing the corruption at the time the corruption is detected, as shown at block 304. At block 306, the file system raises an error status indicating that the corruption has been detected. At block 308, the file system optionally suspends execution of the current file system request in response to the error status indicating the presence of the corruption.

The file system defines a repair scan based on the detected corruption using the information recorded at block 308. Example repair scans include, an attribute scan, a file scan, an index scan, a volume bitmap rebuild, and a security descriptor file scan. Defining a repair scan can include defining a complex repair scan which includes a collection of lower level scans.

At block 312, the repair scan is implemented by the file system (e.g., real-time repair module 212, FIG. 2). A repair routine is executed to implement the repair scan. The repair routine may be run at the top-level point of execution within the current thread, or a separate/dedicated thread may be initiated to service the repair scan (i.e., the repair is posted into a queue where a dedicated thread picks it up and carries out the repair). If the repair scan is a complex repair scan (i.e., including a collection of lower level scans), the complex repair scan is implemented including any associated lower level scans. If the file system request is a recursive request, the file system unwinds to the top level request in the recursive requests, and implements the repair scan with respect to the top level request.

Figure 3:
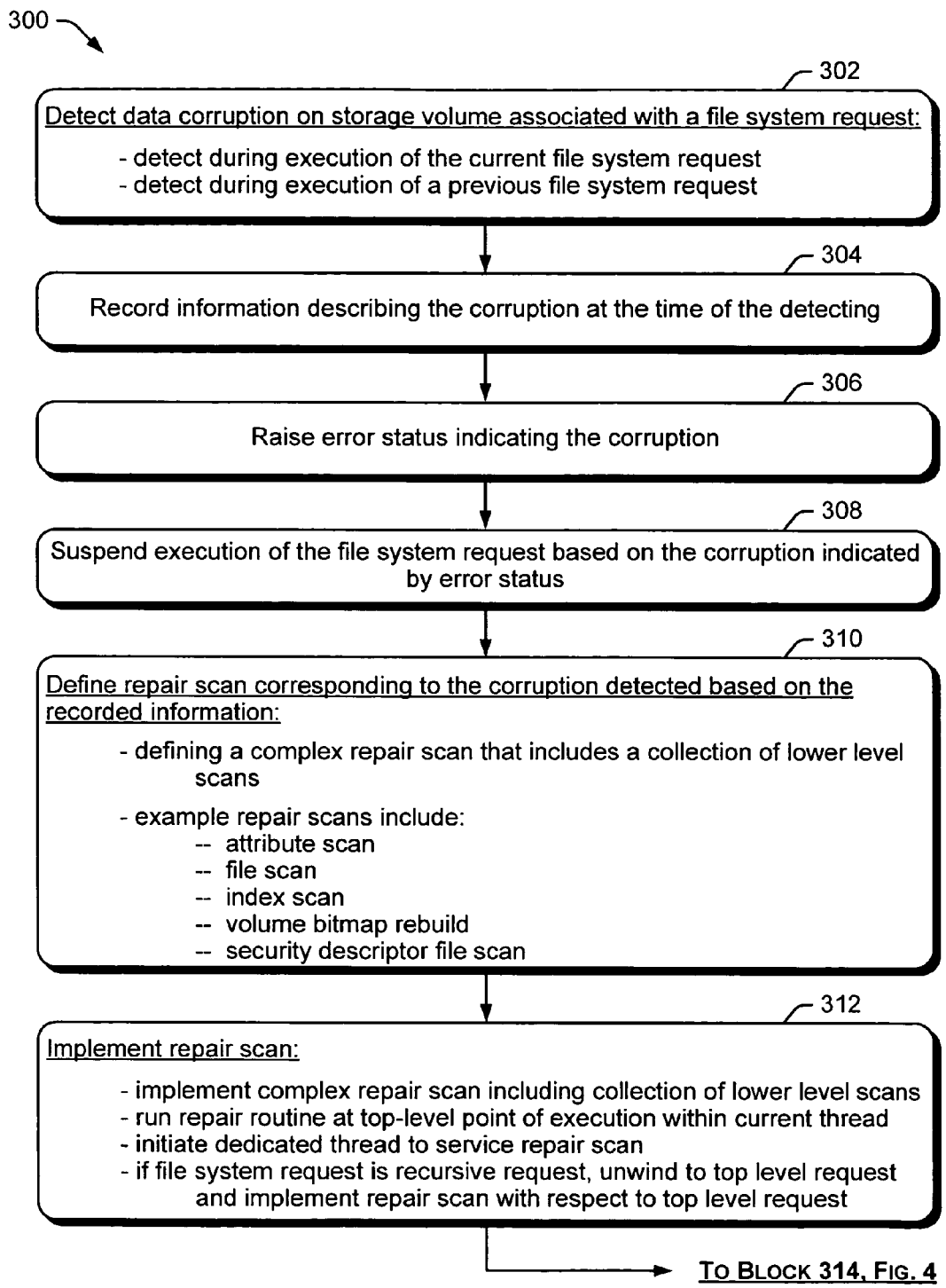
FIGS. 3-5 are flow diagrams illustrating exemplary methods for implementing an enhanced file system that provides for the real-time and online repair of corruptions detected on a running volume.
Figure 4:
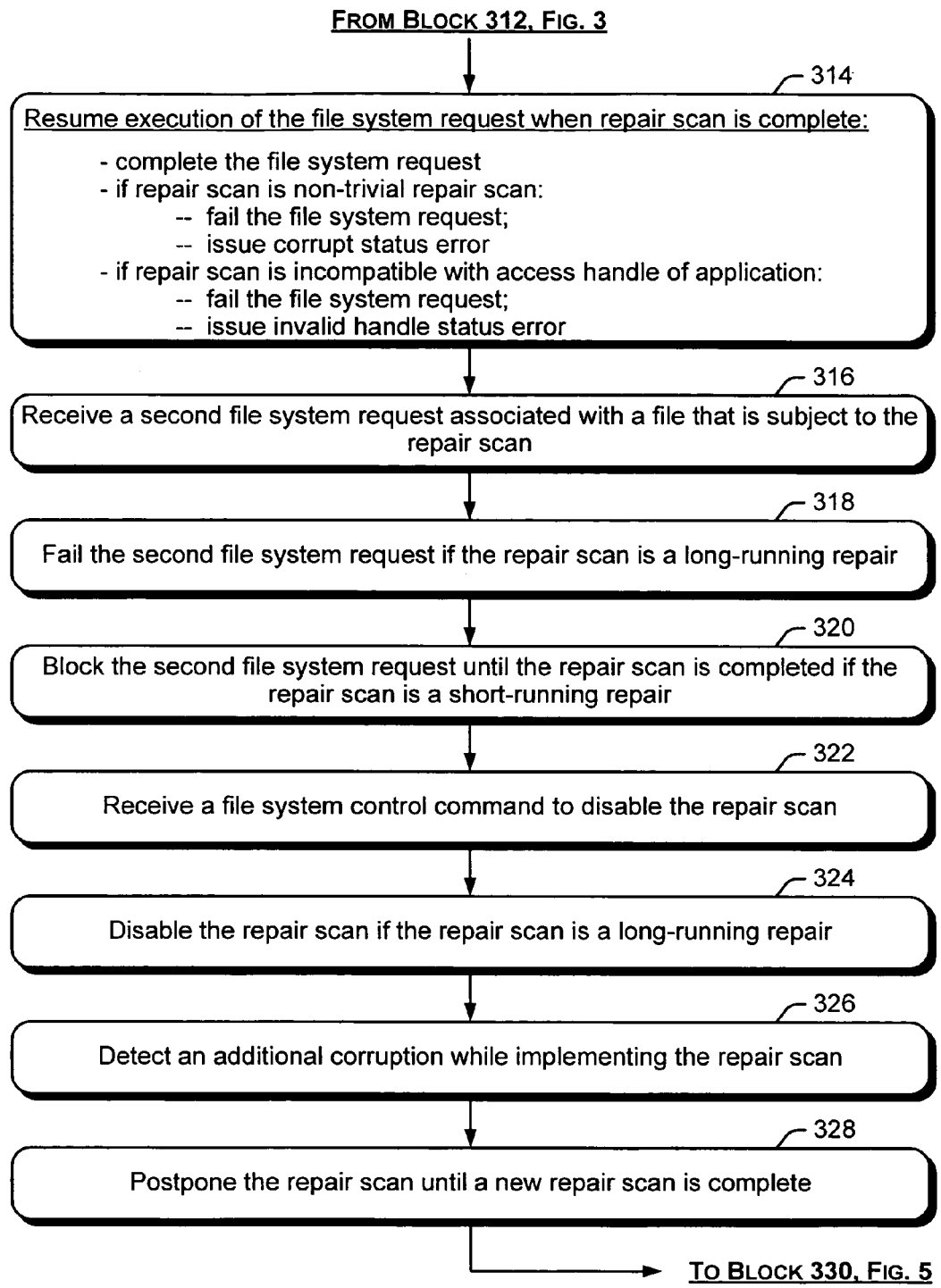
Figure 5:
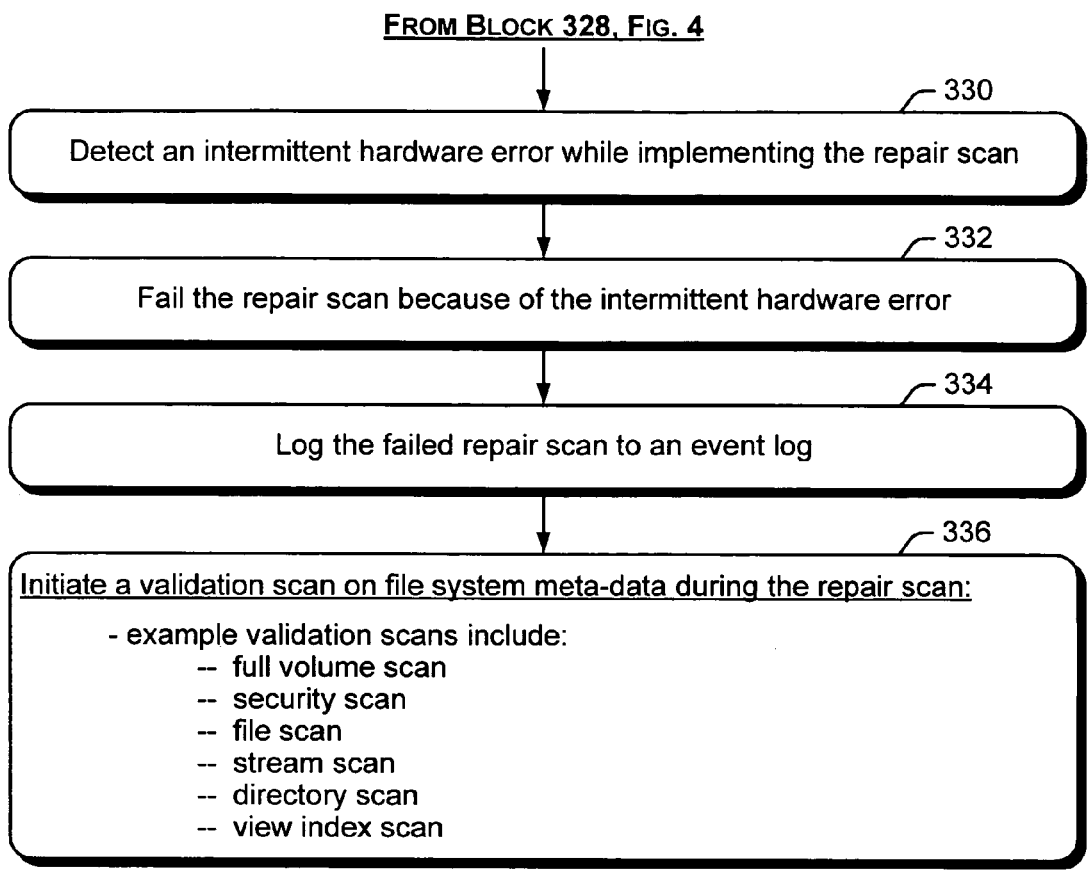

The method 300 continues from FIG. 3 onto FIG. 4 at block 314. At block 314, the current file system request resumes execution after the repair scan has completed. Resuming the file system request typically includes completing the request as intended. However, if the repair scan is a non-trivial repair scan, and therefore has not yet completed, the file system request will fail and the file system will issue a corrupt status error. A synchronous request may wait until the repair is complete before resuming. Also, if the repair scan is incompatible with the access handle of the application making the request, the request will fail and the file system will issue an invalid handle status error.

At block 316, a second file system request is received that is associated with a file that is subject to the current repair scan. If the current repair scan is a long-running repair scan, the second file system request will fail, as shown at block 318. If the current repair scan is a short-running repair scan, the second file system request is blocked until the current repair scan is completed, as shown at block 320.

At block 322, a file system control (fsctl) command (i.e., notification mechanism) to disable the current repair scan is received. Such fsctl commands are received from user/administrator input. If the current repair scan is a long-running repair scan, the repair scan is disabled as shown at block 324. Otherwise, the current repair scan is completed.

At block 326, an additional corruption is detected while implementing the repair scan. In this case, the repair scan may be postponed until a new repair scan is completed, as shown at block 328.

At block 330, an intermittent hardware error is detected while implementing the repair scan. Repair scans are failed when intermittent hardware errors are detected, as shown at block 332. Repair scans that are failed due to intermittent hardware errors are logged to an event log, as shown at block 334. A user is then able to review the log and fix the hardware error.

At block 336, a validation scan is initiated on file system data during the repair scan. Example validation scans include a full volume scan, a security scan, a file scan, a stream scan, a directory scan, and a view index scan.

Appendix

This appendix provides additional details of corruption detection, repair scheduling, corruption and repair reporting, and managing a repair process as discussed above with respect to file system 208 and real-time repair module 212. As noted above, although the NTFS (New Technology File System) file system is provided as an exemplary file system, there is no intent to limit the application of the described file system enhancement to any particular file system.

Application Compatibility

Client applications, depending on the severity of the repair and the modes of the open handles may be impacted due to the repair of NTFS corruption. If the repair is quick then any file system request initiated by an application will be made to wait while the repair is underway, In these cases the repair operation should be transparent to the app. If the repair is non-trivial then the request will fail with a STATUS-CORRUPT-XXX class of error.

Applications may need to handle the result of a repair operation which can include invalidated handles and or changes in the underlying files they are manipulating. Repairs may affect the executables which comprise the application as well as any data files in use. If possible NTFS will report the changes through USN and DirNotification events. If the changes are compatible with the current access and share mode of the file then the application should be able to proceed without incident. However If the repair is not compatible with the application then it will see STATUS-INVALID-HANDLE. Applications will need to handle the case where their handle can no longer be used to access the file. This is similar to the current behavior where corruption may make a file inaccessible but with self-healing NTFS the file can be made accessible without a dismount and repair.

Well written applications which use multiple data files and depend on data consistency across them will be impacted by a change to one of the files accompanied by the invalidation of the handle they use to access the file. This will look similar to the current model where autochk or chkdsk may modify one of their data files between volume mounts.

The executable files may have been repaired and the data in them altered. NTFS will need to invalidate any stream which is currently mapped as a image if it makes any change which affects the bytes in that stream. The running image may not hit any errors as long as the image is still in memory. At the point where any request reaches NTFS on a file handle or stream which has been marked as invalid then NTFS will fail the current request with STATUS-INVALID-HANDLE. Repairs made to certain files may cause the application or even the operating system to die.

Concurrent File Access

Self-healing NTFS will have to check whether a file which is being opened or created is subject to modification or deletion due to a currently running or scheduled repair operation. This repair is typically being performed on the file itself but other cases which impact the target file exist such as a directory scan on the parent or a rebuild of the security file. If any repair is running which could impact this file then only an open with a sharing mode which shares with readers, writers and deleters will succeed. Incompatible opens will either block or fail depending on the complexity of the repair in progress. In one embodiment, all user file opens are blocked while a repair is in progress.

New File Creates

New file creates will block on the following repairs provided the caller is willing to share with everyone. It will fail with the appropriate error otherwise:
  Directory scan on ancestor of the target create. This includes any directory traversed in the process of creating the new file.
  Repair on security stream.

Existing File Opens

Opens of existing files will block on the following repairs provided the caller is willing to share with everyone. It will fall with the appropriate error otherwise:
  Any scan on the file being opened.
  Directory scan on the parent traversed to make this open.

Existing Open Handles

Self-healing NTFS will always have priority in performing repairs. This means the repair is always granted read, write and delete access. Once this access is granted then any existing handles which are incompatible with this access must be invalidated. NTFS will mark the CCBs for the file as invalid and fail the requests. In some cases all existing handles on the stream must be invalidated. In those case NTFS will orphan the SCB which backs the file and create a new SCB for future access to the stream.

Mapped Files

The current NT implementation of mapped files prevents the file from being truncated if there is an active user mapped section. Users also have direct access to the file data through this section and NTFS has no way to serialize this access. Self-healing NTFS doesn't have any reason to modify data in a stream with a mapped section but may need to truncate or even delete the stream. It's the repair truncate operation which is incompatible with mapped section. NTFS needs to orphan the data section in this case which means all objects which use the same section. The cache manager also uses the same section. All the handles and sections currently on the stream will need to be invalidated and any access on those handle will return STATUS_INVALID_HANDLE.

Simple example—what if the user maps the file using this handle. Check the call to map and see if it can fail in the filesystem callback.

Event Logging

All discoveries of corruptions and the subsequent repairs made by the NTFS repair thread are logged to the system event log and/or repair log. All event log entries contain some or all of the following data:
  Descriptive reason for the repair.
  Filename and full path to the file.
  VCN for the corruption (for allocation corruption).
  File Id
  Note that the eventlog and/or repair log itself may be corrupt.

Preservation of Orphaned Clusters

There will be no preservation of orphaned clusters. Orphaned clusters are those marked allocated in the bitmap but don't belong to any file.

Preservation of Orphaned Files

Operates the same as chkdsk behavior.

Mapped Files and Images

Memory manager doesn't allow a file which backs either a data section or image section to be truncated. If a repair needs to truncate or delete a stream which backs either a mapped section or image section then NTFS will invalidate that attribute. Any attempt to read or write to the backing attribute will fail with STATUS_INVALID_HANDLE. This error may not be seen immediately as the app could continue to run with the data already in memory. Since NTFS must invalidate the actual attribute it means that handles on the attribute will be invalidated, even those that are compatible with the repair operation.

Oplocks

Oplocks suggest that a caller may have cached files locally in another location. There may be pending changes at that location which would be written back to the NTFS store when the oplock is broken. Self-healing NTFS will first determine which handles may be invalid to prevent incompatible operations from occurring during the repair. Then it will break the oplocks and begin the repair. NTFS will not wait for the oplock break acknowledgement before starting the repair. This is to simplify the repair model and not block the system waiting for a user action before a repair can proceed.

Exclusive oplocks will always be broken to FILE_OPLOCK_BROKEN_TO_NONE. NTFS will allow the handle holding the oplock to perform write operations as long as the earlier scan to check for handle compatibility succeeds. Break file locks protect a range of a files. File System Filters are repaired only at top level. If a user has a handle it's possible that a filter always maps access to a different file. This is probably not an issue if the user's file is being repaired. Don't necessarily need to fail this at the IO level.

Special Files

Special files like the hiberfile, pagefiles, registry hives, the TxF TOPS stream, and crashdump files pose a unique problem to repair. They are closely tied to the file system and their readers and writers have made assumptions about their cluster layout. A notification mechanism will be provided to stop users of these applications from continuing to use clusters that may no longer belong to their files and corrupting the disk.

The same goes for files pinned by MARK_HANDLE. Since they perform direct I/O to clusters, without necessarily having a handle open (they have a file object referencing the file?), these are particularly hard to deal with. Not repairing them is an acceptable compromise. Corruptions in the pagefile may be intolerable. There will be paged pool issues to deal with. Even worse, our own code might need to be paged in.

Transacted NTFS (TxF)

If the target file is a part of a TxF transaction, repair needs to notify TxF before actually effecting a change. This is a synchronous call out that happens with the resources held around the same time that the file handles are invalidated. (In fact, TxF may do all the handle invalidation themselves). TxF, on its part will free up all its in memory state for the transaction (version history, STOPS stream, etc), except for the TxF file lock. Repair will also callout to TxF once the repair is done so that it can proceed with its transaction abort if needed. Of concern is the granularity of these callouts. Repair shouldn't be too burdened by them. It may be that aborting all existing transactions is a viable solution for particularly destructive repairs spanning the volume.

TxF will also need to handle the more general issue of files not being in the states that it expects them to be, especially following a crash or during abort. TxF will write to the event log whenever repair interferes with its operations. If the repair is destructive to the integrity of the transaction then the transaction will be aborted. This is to ensure the durability of the transacted operations and allows the user to know when a particular change did not make it for some reason. All the existing transacted handles will be invalidated.

The TOPS Stream as well as Common Log files will be treated as special files that cannot be repaired. However, TxF and Common Log need to know how to deal with corruptions in their respective areas. It'd however be ideal if those were allowed to be repaired as they will simply be left corrupt otherwise.

Corrupt Initial System File Records Discovered during Mount

Once the volume has been recognized as an NTFS volume with a valid version, the file system will validate each of the initial system file records. This internal file validation could easily expand into a full volume scan if corruption is detected.

NTFS Restart Failure

NTFS could hit a LOG_FILE_FULL while running restart. Theoretically this is impossible if the reservation strategy is correct. This is handled this by retrying the mount but don't run restart. This will require NTFS to run a full scan in the background but the volume should be available in the meantime.

Attributes

These describe low-level operations, specifically what actions will be done to the disk.

Basic Attribute

A Basic Attribute is an attribute in a file record. It could be a resident attribute, a nonresident attribute at VCN 0 or any attribute which describes a piece of a non-resident stream.

On-disk internal attribute inconsistency—Remove any non-resident attribute except for user data attribute at VCN zero. Make those zero length. Remove any resident attribute except for user data attribute. Make those zero length. Need to make sure attribute list is updated. Need to make sure attribute list is updated. Need to validate remaining file is still valid. Remove attribute from any index it may be contained in.

On-disk inconsistent with SCB—Validate on-disk attribute first and make necessary changes. Then update SCB and FCB with correct on-disk changes.

Inconsistency in in-memory structure only—Update SCB and FCB from disk again.

Allocation length higher than supported value. We can verify this value against the mapping pairs and highest VCN values.

Complex Attribute

A Complex Attribute is the set of all the Basic Attributes which make up a full NTFS attribute.

An internal attribute validation checks that all of the pieces of the attribute are self-consistent. If so NTFS will update the SCB and FCB to reflect this. An external attribute validation involves scanning the MFT for all pieces of the attribute. Since this involves a full scan of the MFT there really isn't any reason not to do the external file validation instead.

The following errors indicate corruption of the complex attribute:

Basic Attribute exists for piece of file past allocation size—remove the unneeded piece.

Missing attribute within Complex Attribute—Do an internal attribute validation first. If this resolves to a consistent attribute then update the SCB to reflect this. Otherwise move to an external file validation.

Inconsistent SCB values—Do an internal attribute validation.

MCB has a range of length 0—Do an internal attribute validation.

Attribute Contents

Self-healing NTFS will validate contents of attributes with NTYS meta-data, or the portions of the attributes which have NTFS meta-data. For example reparse points contain fixed data and user defined data. NTFS won't make any attempt to preserve or validate the user portion of any attribute.

Content validation of specific attributes in NTFS meta-files is described elsewhere.

Non-resident Attributes

LCN zero in file other than boot file—Attribute is invalid and should either be set to zero length or deleted. Do an internal file validation after this.

$Standard-Information

Invalid $STANDARD-INFORMATION—Do an internal file validation. Rebuild the standard information.

$Attribute-List

Attribute List Length cuts off existing attributes—Do an external file validation.

Attribute List Entry has zero length—Do an external file validation. Attribute List has entry not in file—Do an internal file validation.

Attribute List is missing entry which is in a file record—Do an external file validation.

$Data $DATA attributes—NTFS will only take certain actions when repairing corrupt user data streams. It will either create a zero length attribute if one is required to be present, truncate to zero if it currently exists and is corrupt, or delete entirely.

$Reparse-Point

Invalid $REPARSE-POINT—Remove attribute from file and from reparse index. Update FCB/SCB to indicate there is no reparse point.

$Reparse attribute—Junction points can only be on directories and the directories must be empty. $Reparse attributes and $EA attributes can't both exist on the same file or directory. Reparse tag is part of DUPLICATED-INFORMATION.

$EA and $EA-Information $EA and $EA-INFORMATION must both be present if either is present. EA Information also exists in DUPLICATED-INFORMATION for the file. The EAs for a file need to be consistent with the EA information in the directory entries. An internal EA validation verifies that the EA and EA-INFORMATION are valid attributes, the EAs are well constructed and that EA information in the directory information matches. In addition there is no $REPARSE attribute in the file.

EA attribute is missing—Do an internal EA validation.

Indexes

Indexes over attributes have an entry in the Index which corresponds to an attribute in a file. Examples are filenames, reparse points and object ids. Some errors below apply to all indexes but the index specific errors apply only to indexes over attributes.

An internal validation of these indexes involves verifying that the index is well-formed and properly sorted. Additionally the entries in the indexes have a corresponding attribute in the file.

An external validation involves doing a full scan of the MFT looking for entries which correspond to this Index.

Index Header

Index header offsets point outside of buffer—Rebuild index through full MFT scan.

Header points to no entries—Rebuild index with a full MFT scan. Consider optimizations based on shuffling btree or rebuilding it in place by walking all index buffers and adding entries to new index being built.

Hit end record before last index entry—Rebuild index with a full MFT scan. Optimizations include orphaning only the entries past the bogus end record or testing if there another end record.

Index Buffer

Upper 32-bits set in IndexBlock—Discard this index and rebuild the index with an MFT scan. Consider looking at ignoring the invalid bits and reset to zero if an internal check indicates the index entries are valid.

Incorrect values in lower 32-bits of IndexBlock number—Rebuild index through a full MFT scan. Consider optimizations base on corruption in IndexBlock field only. This can be done by an internal index validation after setting this to the expected value.

Invalid Header signature—Rebuild index through a full MFT scan. Consider ptimizations based on corruption in signature only.

Invalid USA header and array—Rebuild index through a full MFT scan.

Index buffer with empty leaf node—Do an internal index validation.

Index Entry

Internal index entry lengths extend beyond length of entry—Remove the entry, do an internal index validation and then do a full MFT scan looking for orphans. The MFT scan can be nooped if NTFS can recover the file reference from the index.

Attempting to add entry which already exists—This probably indicates a bug in the logic. There should already have been a check to see if the entry exists. If there is a real problem then the fix is to do an internal validation of the index and then to an MFT scan to search for orphaned entries.

Mismatch of NODE value—All entries within an index buffer need matching values. Rebuild index through a full MFT scan. Consider optimization based on corruption in node bit in either entry on buffer. Also consider whether the current entry can be removed, an internal validation performed. This would leave the index in a usable state while an MFT scan looks for orphans.

Invalid Index entry lengths including length 0—Rebuild index through a full MFT scan. Consider methods to extract single bad entry. This can be done if this is a leaf by discarding the remaining entries in the index bucket and an MFT scan to look for orphans only.

Expected index bitmap missing—If all the other index attributes are present then the bitmap can be rebuilt by walking the btree. If this fails then a full MFT scan is needed.

Index buffer contains end entry only—Rebuild index with a full MET scan. Consider optimizations based on shuffling btree or rebuilding it in place by walking all index buffers and adding entries to new index being built.

Unbalanced btree—Rebuild index with a full MFT scan. Consider optimizations based on shuffling btree or rebuilding it in place by walking all index buffers and adding entries to new index being built.

Record Allocation Bitmaps

Bit already set when trying to set—Uninitialize record allocation package and reread from disk. Hard error if this corrupt bit was found in same routine which reinitialized the record allocation package.

Bit already cleared when trying to clear—No error but log act of clearing bit again.

Basic File Record

A Basic File Record is any file record currently marked IN-USE. It could represent an entire file or only some of the attributes of a file.

An Attribute spans file record boundary—Insert SEND attribute past last valid attribute. Need complete file validation after this.

Corrupt record found from CheckFileRecord—Validate each attribute, make sure the attributes are laid out correctly, validate the header values. If the result doesn't contain even one attribute then mark the file record as not IN-USE. Do an internal file validation of the file which this refers to.

In-Use bit not set—If there are external references to this file record then check if the MFT bitmap bit is set. If bit set or other indications suggest this file record should be in-use then reset the bit in the file record. Otherwise mark the record as not in-use and do an internal file validation. Extend to an external file validation if needed.

File signature corrupt—Delete all attributes in this file record. Do a full file validation on the file if known. If file is unknown then may need to do a full scan looking for index entries referring to this. If found then rebuild known pieces of file and generate notifications. Consider optimizations based on limiting corruption to the file signature.

BAAD file signature, bad USA header, bad offset fields—Delete all attributes in this file record. Do a full file validation on the file if known. If file is unknown then may need to do a full scan looking for index entries referring to this. If found then rebuild known pieces of file and generate notifications.

Bad file record check—Delete all attributes in this file record. Do a full file validation on the file if known. If file is unknown then may need to do a full scan looking for index entries referring to this. If found then rebuild known pieces of file and generate notifications.

Complete File

A Complete File is all of Basic File Records, external allocation for non-resident attributes and external references. Most files on disk are either user files or user directories. The specific properties of system files are described elsewhere. Files and directories have the following properties.

MFT bitmap has corresponding bit set for each file record in the file.

All file records for the file are well-formed and have the IN-USE bit set.

Base record has 0 for its base record.

Other records refer to the base record.

VIEW-INDEX bit isn't set.

FILE-NAME-INDEX indicates this is a user directory.

File has the following required attributes ($STANDARD-INFORMATION, $FILE-NAME).

$FILE-NAME exists with either DOS or NTFS bit then corresponding $FILE-NAME with other flag must exist.

User files must have one unnamed $DATA stream. User directories must have a filename $INDEX-ROOT along with other required index attributes. Only one of these may exist in any user file or directory.

Following attributes may exist ($ATTRIBUTE-LIST, $OBJECT-ID, $SECURITY-DESCRIPTOR, $REPARSE, $EA-INFORMATION, $EA, named $DATA, $LOGGED-STREAM). $DATA streams with duplicate names will not be allowed.

An internal file validation assumes that all the information about the file is in the file records NTFS can find by walking the base file record and attribute list if present. It doesn't concern itself with outside references back to this file (i.e. entry in a directory to this file).

The next level of checks verifies that each of the indexed attributes and security reference have valid corresponding external data.

An external file validation walks the entire MFT looking for file records which belong to this file.

The following errors are specific to files.

File is marked as directory but is missing $INDEX-ROOT attribute—Check whether the directory bit is incorrect by looking for unnamed data stream and/or other $INDEX attributes, If it still looks like a directory then create empty directory and scan MFT for other files in directory. Delete other $INDEX attributes.

No valid links for user file—Need to check if there are valid private links. If need to insert a name then put it in FOUND directory in root.

No $STANDARD-INFORMATION attribute—Most of the values can be deduced from the rest of the file. Treat it like updating timestamps, attributes and security.

Attribute exists in file but not in Index—Put corresponding entry into index. It is possible that there is a conflicting name already in the index (i.e. file name). In that case the link for the file must be created in the 'Found' directory.

Unable to find expected attribute indexed elsewhere—If possible then insert corresponding attribute provided it doesn't conflict with existing state of file. Otherwise remove the entry in the index. Do internal check on file.

Unable to find expected attribute (not indexed elsewhere)—Do an internal file validation and update SCB/FCB to match changes.

Missing Required Attribute List—Do a full external file validation.

Missing one attribute of long/short name pair—First do a scan in the directory with the orphaned member and see if the other name exists there. If so incorporate it into file. If long name exists and is a valid short name then convert to a long/short name filename. If long name exists and isn't a valid short name then generate one. If there is a short name then simply make it a long/short name.

Log File Corruption

Failure to start log
Failure to read during restart
Hardware failure vs. data corruption error Root Directory The root directory has all of the properties of other directories plus the following:
It contains an entry for itself.
It has an entry for each of the system files.
It has both the SYSTEM and HIDDEN bits set.
Its own name is ".".
It is always a directory.

Volume Bitmap

Attempt to set bits which are already set—This should be a hard failure as NTFS already does a retry if the bits came from cached information.

Attempt to set LCN 0 free—Do an internal file validation on the file. If the attribute shouldn't have LCN 0 then set it to zero length.

Security File

Corrupt descriptors—check backup descriptor. If still corrupt then need to remove corrupt descriptor AND walk MFT looking for matching files. Correct order is to walk MFT first and change security. Keep table of corrupt descriptors and don't allow match on this type.

Orphaned descriptors—Can be removed but need to confirm with TXF that it doesn't need this entry.

Specific errors include:
Key Length is not the size of a SECURITY-ID in the security ID index.
Data Length is not the size of a SECURITY-DESCRIPTOR-HEADER in the security hash index.

Attribute Definition File

Missing $DATA attribute—Rewrite the attribute table. This can be done in place without posting. However NTFS needs to track this is underway in the event a cascading corruption is hit which needs to be repaired first.

Reparse Point File

The reparse point file consists of a single Index "$R". The index maps reparse point tags to Ntfs file IDs. The file should have all well-formed attributes and file records. The reparse point has the following properties.

VIEW-INDEX bit set in header. Should not have FILE-NAME-INDEX bit set. SYSTEM-FILE bit set.

File name is $Reparse and is contained in the $Extend directory.

It has no quota charged.

It has the System/Admin security descriptor.

It has only the following attributes ($STANDARD-INFORMATION, $ATTRIBUTE-LIST if needed, $FILE-NAME, $INDEX-ROOT for $R, $INDEX-ALLOCATION for $R and $BITMAP for $R).

The $INDEX-ROOT attribute should indicate that this is a view index and the collation values are correct.

An internal reparse file validation checks that the above are present and only these are present. The Index should be well-formed and sorted correctly,. It also validates that the reparse tag keys in the $R index are valid and that the file ID's they point to lie within the valid portion of the MFT. If the Index is known to be corrupt (an actual repair is underway) then requests to access the index will be blocked or failed. If a validation is underway but no corruption has been found then requests to access the index will proceed under normal synchronization constraints.

The next level of check will take each entry in the index and verify that the file Id referenced is actually an in-use user file and that it has a corresponding reparse attribute and the attribute contains a valid reparse point. The reparse tag on the file should match the tag in the reparse point and match the tag in the SR index.

The final level of check is a full MFT scan looking for orphaned reparse point attributes in files which don't have corresponding entries in the index.

The following errors are specific to the $Reparse file along with the appropriate repair:

Unable to find corresponding entry in the $Reparse file—Do an internal validation of the file which has the orphaned reparse point. Then do an internal validation of the $Reparse file. Finally insert the reparse point into the reparse index as needed.

Paging Files

Any failure performing IO to the paging file can be fatal for the system. There are limited repairs that can be done here.

Mapping pairs not fully loaded—Fail the current request and post a work item. Do an internal validation of the file and then carefully load the allocation information from disk into the MCB. This could cause the system to fail.

MFT Construction

File record 0 appears to be available—Do an MFT scan to rebuild the MFT bitmap.

Reference to hole in MFT—Generate clusters for hole. Validate any file which points to uninitialized file records.

MFT and MFT Mapping in MCB

Unable to find first Mapping—Verify mapping by reading initial file record in both MFT and Mirror. If unable to find valid entries then do a full disk scan.

MFT Bitmap $BITMAP doesn't exist—Do a MFT scan and rebuild the bitmap. Insert this into the $MFT file.

Failed Abort

A failed abort can leave a volume in a corrupt state. If the individual streams involved in the transaction can be identified then it may be possible to run a repair scan on them only. Otherwise it may be necessary to do a full volume scan. Some errors may be safe to ignore as NTFS will detect the problem when a user accesses them again.

The following specific errors may occur when processing an abort:

Invalid log record check

Restart Failure

A failure to run restart may leave the volume in an invalid state. NTFS can recover from this by completing the mount but leaving the volume marked dirty or scheduling a full volume repair. It is also possible to simply leave the volume in the corrupt state and allow the individual errors to be detected and fixed when encountered.

Initializing the Restart State

The following specific errors may occur when initializing the restart state:

Internal inconsistency in the LFS structures in the log. LFS currently raises a corruption status in these cases.

Error reading the NTFS restart record.

Error reading any of the log records for the restart tables in the NTFS restart record.

Invalid NTFS record header for any of the restart tables written to disk.

Corruption in the restart tables written within a log record.

Attribute name entry has an invalid index for the underlying open attribute entry.

Running the Analysis Pass

The following specific errors may occur when running the analysis pass: Failure to read a log record from disk. Invalid log record read from disk.

Initializing the Dirty Page Table

The following specific errors may occur when initializing the dirty page table:

Dirty page entry refers to an invalid attribute index.

Dirty page entry/refers to a non-existent attribute.

Running the Redo Pass

The following specific errors may occur when running the redo pass:

Failure to read a log record from disk.

Invalid log record read from disk.

Log record refers to an invalid attribute index.

Log record refers to an attribute index where the corresponding attribute isn't present.

Describe the structural implementation here. Include locking and actions if further corruption discovered.

Simplest method of logging changes is to log entire file records, index buffers, nonresident attributes.

If index is being rebuilt then entries in it can be treated as valid. If we find an orphan in normal processing then it can simply be added at the same time the full scan is underway. We must block user generated entries from being added in the meantime however.

MFT Rebuild

A full MFT rebuild involves doing a full scan of the clusters on a volume searching for MFT file records.

NTFS will impose a number of restrictions on when this search can take place and what 'file records' will be recognized. NTFS may encounter a situation when an image of another NTFS volume is stored as a file on the current volume. Also the current volume could contain snapshot information or stale MFT records from defrag operations.

Volumes must be NTFS version 4.0 volumes or later. This means that new file records will always have the file record number embedded in the header.

NTFS will complete a scan as part of the upgrade process to store the correct file record number and volume identifier into each in-use file record. Once this scan is complete then a flag is set in the volume DASD file record to indicate that a full MFT rebuild is possible.

The MFT rebuild consists of the following steps:

Boot sector validation which identifies NTFS as the file system type. NOTE—if the cluster size can't be determined from the boot sector then NTFS will have to build up mapping based on a default size and then determine real cluster size later. Backup boot sector can be used in the initial recognition phase to provide possible verification or correct backup copy of the MFT location and cluster sizes.

Attempt to build full mapping pairs through the MFT records pointed to by the boot sector. This could result in nothing found if the MFT can't be reconstructed in this way. This is an expected error in the case where NTFS is rebuilding the MFT from scratch.

Initiate the disk scan if the mapping pairs are incomplete from the step above. Start reading the disk looking for possible file records. The USA signature, file record number and volume identifier in the potential file record are used. Possible spurious hits could include:

File records in the MFT mirror
Old MFT data from MFT defrag
Stale data from previous instance of volume prior to reformat
Volume snapshot data
NTFS disk images stored as files
Data in user files which looks like valid MFT records (possibly maliciously)

As NTFS encounters these records it will group them into volume candidates by the volume identifier field. It will build up separate copies of the possible volumes and eliminate them when possible. As each record is found its location using a default cluster size is stored into the MCB for that volume identifier. In the event of a conflict (there is already an entry at that location in the MCB) NTFS will examine the LSN on the page and use the page with the higher LSN. The file records in the MFT mirror will appear valid but reside at the wrong location when assuming they are part of the MFT. NTFS will keep two copies of mappings for the first 0x10 file records of each candidate volume encountered to this point. If a file record is encountered which describes the MFT itself then NTFS will scan the file record looking for $DATA attributes and remember the partial mapping found in a separate MCB.

When the volume scan completes NTFS may have multiple volume candidates to resolve. For each candidate NTFS has saved the following from the volume scan.

Volume Identifier—stored in volume DASD and file records
Partial MCB from self-describing MFT file records
Partial MCB from MFT file records found on disk
Partial MCB for alternate possible valid MFT records in mirror range NTFS then needs to analyze each of these candidates to find these that could be the actual MFT for this volume. If NTFS was able to find the file records for either the MFT or MFT mirror then it can validate whether they are at the offset described by their own mapping pairs. This is the first level of authentication. If there is only one volume candidate then NTFS can assume that all valid file records found belong to that volume.

NTFS may need some knowledge of available free clusters while rebuilding the MFT or some of the system files. This may at a point in time where there isn't a valid $DATA attribute in the volume bitmap stream. The size of the volume can make it impossible to store a complete copy of the bitmap in memory. Instead NTFS can scan the known file records and look for allocated clusters belonging to a subset of the volume bitmap. This partial information can be used to allocate new clusters to the MFT, volume bitmap and logfile.

Allocate sufficient free clusters to fill in any holes in the MFT. Add these clusters to the mapping information for the MFT and initialize the actual clusters with uninitialized file records.

MFT Bitmap Rebuild

If the MFT bitmap attribute is lost then NTFS can rebuild it from scratch. This will be done after NTFS scan to build the mapping pairs for the MFT takes place. In the event that the clusters belonging to the MFT bitmap are lost NTFS takes the following steps:

Calculate the number of clusters needed for the bitmap.
Find the necessary clusters. This may involve scanning the known MFT records for free clusters. This may require separate scans by ranges.
Build up the mapping Information for this and store it into an Scb for the MFT bitmap.
Initialize the bitmap to all 0xffffffff.
Scan the known file records in the MFT looking for uninitialized records and clear those bits in the MFT bitmap.
Leave bits set that must be set even if the corresponding records aren't in that state yet. This includes the first 0x10 system file records.

The MFT bitmap is now ready for the normal verification pass as part of the full online chkdsk scan.

MFT Mirror Rebuild

If the MFT mirror file is lost it is rebuilt from the MFT after the MFT is completely rebuilt.

Logfile Rebuild

The NTFS logfile is used when modifying NTFS metadata. The logfile needs to be Initialized and available when doing repairs that require logging. If the log file is corrupt then It must be repaired before proceeding with any repairs that use the log. Note that all that Is necessary is that the mapping information for the log and the SCB point to a useful location on the disk. The file record for the log could be repaired after this.

There are several types of corruption in the log file. These could be both internal and external:

Corrupt metadata describing logfile (external)—This is when NTFS either loses the file record for the logfile or the metadata that describes the log is corrupt. In each of these cases NTFS needs to find sufficient clusters to use for the logfile. NTFS then builds an Scb with this mapping and initializes the clusters for the log.

Corrupt data within the logfile (internal)—If this occurs during mount or restart then NTFS can treat the entire log as corrupt and reinitialize it. If the volume is already active then NTFS can ignore the error but mark any file which is part of the current transaction as corrupt and perform a verification scan on them.

Reinitializing the log file involves the following:
Write a pattern of 0xffffffff into the entire log. This will insure that stale data already present in those clusters won't confuse NTFS.
Pass the highest known LSN on the volume to LFS. LFS will then initialize the logfile so that it will generate LSNs which are higher than this value.

Full Volume Repair

This corresponds to the full scan that chkdsk currently does.

Volume Availability

The NTFS volume will be available to the extent possible in the cases where an administrator has initiated this request on a mounted volume. In cases where NTFS has detected serious corruption in the mount path then the mount can block until the volume is in a usable state.

If a user is active on a volume where any repair scan is underway then he can encounter corruption which prevents his operation from completing. If there is a workaround available then the user's request can be completed. Otherwise his request will block behind the full scan.

Preliminary State

NTFS must have certain resources in order to perform the full scan. The following must be in place before the full scan can begin:
Mapping information for full MFT (look for inconsistencies between the in-memory MCB information and the mapping pairs in the self-describing MFT file records if available)
Mapping information for MFT bitmap
Mapping information for MFT mirror
Mapping information for NTFS logfile
Mapping information for NTFS volume bitmap
Some cache of known available free clusters in the case where the volume bitmap is suspect.
Known bad clusters from Bad Cluster file if available. List of bad clusters from a volume scan here if requested.
Usable Upcase table.
Usable attribute definitions table.

Initial MFT Scan(s)

NTFS scans through the MFT records described by the mapping pairs. It may be necessary to make several passes due to limitations in how much information NTFS can maintain in memory. The first scan will do the detailed work for each file record. Subsequent scans should only need to walk through each MFT record looking for the data pertinent to type of information needed. At the conclusion of this stage the following should be true:
Verify the MFT bitmap corresponds to state of file records in MFT. This means that all IN-USE file records are set in the MFT bitmap as well as the bits for required system file records which may be corrupt. This might need to be done in multiple scans depending on the size of the MFT bitmap.
Count of number of indexed attributes. This includes filename attributes, reparse attributes and object ID attributes. This is used later if checking for orphans.
All file records marked as IN-USE are correctly constructed although contents of all attributes may not be checked at this point.
Base file records and children file records are connected through well constructed attribute lists.
User files and directories contain either unnamed data stream or filename index. It may be necessary to insert zero length stream or index here.
System flies contain basic required attributes although contents of attributes may not be correct yet. Invalid attributes for that system file are removed if present (i.e. MFT doesn't have EAs).
Required system files are present even if the internal data hasn't been fully verified.
Files are internally consistent. This means that DOS style file attributes match the NTFS attribute bits on the individual attributes. EA and reparse bits match the contents of those attributes, EA and EA-INFORMATION are consistent.
Also check that if there are multiple file name attributes verify that they aren't multiple matching entries to the same directory.
Accurate snapshot of clusters allocated are reflected in volume bitmap. This may only be a subrange of the full bitmap. It may take several passes through the MFT to rebuild the entire bitmap.
Cross-links found and repaired. New clusters allocated for attributes found with clusters allocated to other streams.

Index Repair Scan

This involves walking the MFT looking for base file records with an INDEX bit set. The indexes are then validated. At the end of this scan the following should be true:
The index is well-sorted.
Index entries are well-formed. Invalid entries are removed and expected to be found in the orphan scan.
Index buffers are well-formed.
Corresponding attribute for remaining index entries are guaranteed to exist.
Count of indexed attributes found in the initial phase is decremented on each validated entry. The count now reflects the number of attributes where the corresponding entry hasn't been found yet.
$INDEX-ROOT for index has correct collation rule and default size.
$BITMAP and $INDEX-ALLOCATION reflect the buckets actually being used

Orphan Scan

NTFS will maintain the count of indexed attributes as it is doing the full volume scan above. As the indexes are validated then the count is decremented as individual entries are encountered in the index. Note that if a user is active on this system and adds entries to an index then the global index count needs to be biased correctly. The full index scan walks through the MFT sequentially looking for indexes. This means NTFS can maintain a point at which all index entries have been validated. If a user changes a directory earlier in the MFT then the index count doesn't need updating. If they are changing entries in a directory after this point then the index count needs to be incremented or decremented depending on the operation being done.

This scan is only needed if there are unresolved indexed attributes remaining after the first two scans above. It involves walking the MFT again and searching for indexed attributes. For each entry found NTFS will look in the relevant index and verify there is a corresponding index entry. This scan can be cut short at the point where NTFS finds a matching number of orphans.

A user active on the system may also encounter an orphan. During a delete file operation for example NTFS may find an attribute without a corresponding index entry. If the full volume scan is underway then the orphaned attribute can be removed and the count of indexed attributes maintained by the volume scan decremented.

NTFS will bump the version number for this release. A backwards compatible NTFS will be made available as a Service Pack upgrade to WinXP systems. The backwards compatible NTFS will support the changes due to the version upgrade end keep the volume consistent when booted on a WinXP system. Changes to the on-disk version for this release include:

New version number stored in volume DASD file record.

Initial scan done to ATTEMPT to update all file records to include the file record number in the file record header. Attribute list restrictions or lack of disk space may make this impossible for some volumes. Flag in volume DASD file record will indicate the scan was completed.

Unique identifier associated with volume, also stored in volume DASD file record and also in header of all file records. This will allow the full volume scan for MFT records to correctly locate the records belonging to a given volume. This will deal with the case where they may be a disk image of another volume or snapshot of this volume contained within a file on the volume. If the volume DASD file record is lost then NTFS can attempt to resolve discrepancies by noting that the file records for the MFT itself have their own mapping information. If multiple MFT file images exist on the volume then only one of them is likely to be positioned correctly according to its own mapping.

Expand the MFT mirror to cover the first 0x10 records of the MFT if possible.

Chkdsk (offline and online]) will honor the attribute definition table on disk if the version number is past the version number known. Typically this means the minor version number as the major version number is rarely advanced.

Version number of last system to mount volume is stored in the volume DASD record.

Update all system files to use new security descriptor.

ChkDsk Related Fsctrls

Wait for current repair to end
What is current repair
How far along is current repair
Kill the current repair
Kill current and pending repair
Initiate a scan (what level of scan, RO or W)

ChkDsk Related Status Codes

Operation failed because repair is underway
Operation failed because corruption was detected Operation failed because repairing file has caused the current handle to be invalidated It may be important to differentiate between a (possibly) transient error where STATUS-CORRUPT is returned while a long scan runs but the user's handle will be valid at the end of the scan and STATUS-CORRUPT which indicates the user's handle will never be valid due corruption found and the subsequent repair.

Registry Settings

Report corruption but do not run on-line chkdsk until user initiates. This way there is no system downtime on any valid files/directories still present.

Thread Running Repair Operation

NTFS will fire off a dedicated worker thread to perform the repair operation. This will be done at the point where it cleans up the IrpContext which has the repair work items. The thread will run at the same priority as the ExWorker threads used by the critical worker queue. NTFS will check whether the thread is already scheduled or running before scheduling a new thread.

If scheduling the worker thread fails then NTFS will have a work item queued but no thread running. NTFS will set an NtfsData flag after successfully scheduling the repair thread, NTFS will continue to attempt to schedule the thread during each fuzzy checkpoint interval if it detects there are work items but no repair thread running.

NTFS will use a count of repair items queued to the global work queue to determine whether the worker thread needs to be scheduled. This value is incremented before the work items are queued and decremented after the work item is completed. A transition from zero to one Indicates that a thread should be fired off by the thread which incremented the value. A transition from one to zero indicates that the current repair thread can exit, An interlocked operation which adjusts the value and tests the previous state can be used to determine the necessary thread changes.

NtfsData Pending Repair Queue

NTFS will use the queue to post new work items and to organize pending work.

First it is the location where the work items are initially posted. These work items describe the corruption found and possibly a hint of the type of repair work to do. The work items are ordered based on when the corruption was detected and posted. There is also an ordinal number in the work item which indicates when the corruption was detected. Work items are initially queued to the head of this queue.

The second use of queue is to maintain the repair operations which are blocked until some other operation finishes. The work item to block waiting on some other repair is queued to the tail of the queue. There is also a reference in the blocked work item to the new work item to complete first if this new repair will fix all the corruption of the original work item. As an example consider we are validating a file and discover that the attribute list is corrupt and lost. The file repair needs to be deferred until there is a full MFT scan looking for all the file records which belong to a given file.

The initial work item will be requeued to the work list while the dependent repair is performed.

When a work item is completed the NTFS repair thread will look through the work queue for items which can be completed as a side effect of the just completed repair. This is done by traversing the list looking for entries which refer to the work item just completed. During this scan NTFS will also look for other corruptions detected in the same object which was just repaired and complete the associated work items as well. Consider that while a repair on a file is underway there is an independent corruption found in another attribute in the file. When the file validation is complete then it must be true that all attributes are correct. There is no reason to initiate another work item on the file. NTFS uses the ordinal numbers associated with the repair items to determine whether the new corruption was found after the file repair was completed.

End of Repair Synchronization

When a work item is completed then the event in the work item is signaled if present. After signaling the event the repair thread will decrement the reference count in the work item and if it transitions to zero then it will delete the work item. The user thread which is waiting on the event will also decrement the reference count in the work item. If the count goes to zero at this point then it is the user thread which is responsible for deleting the work item.

Cancel User IRP or User Thread

There can be a user thread which must wait for a repair operation to complete before it can be executed. At the NTFS top level we can wait for the repair operation through the notification event in the work item. NTFS must wait without blocking kernel mode APCs so that the user can either cancel the thread or the current IRP. If the status code returned while waiting for the event indicates the system is killing the current thread then NTFS can complete the current IRP with STATUS-FLLE-CORRUPT-ERROR. NTFS will use a strategy to synchronize with the cancel IRP. It can also decrement the reference count on the repair work item and delete it if the count has gone to zero.

NTFS will also allow any IRP which is held while a repair operation is underway to be cancelled. NTFS will use the IrpSp.Informatlon field to indicate that it received a cancel on this IRP and complete the IRP In the cancel routine rather than at the point where the wait on the work Item notification event.

Cancel Repair Work

Self-healing NTFS will do any repair in pieces. It doesn't want to trigger any significant time-outs in the system by holding resources for an extended period of time. It will maintain state information with the current work item to know what work to do next. At the beginning of each quantum of work it will check if the user has indicated if the current work item should be cancelled or if the volume being repaired has been dismounted. If either of these is true then the repair thread will abort the current repair along with any other repair indicated. NTFS will then process each work item and signal the notification event along with completing any IRP associated with the repair.

Corruption Detection in the Running System

At the time a corruption is detected NTFS will allocate a repair work item and initialize it with the details of the corruption. The work item is attached to the top level IrpContext. This may require walking up through the chain of thread stack contexts. This is done because the repair may need to be associated with an Irp issued on behalf of a user. The IO stack needs to unwind to the point where a top-level request was issued. As a corruption is detected then NTFS will need to check whether there is already a work item posted for it. This means checking both the state of the FCB or SCB involved in the corruption to see if there is already a work item posted which covers this corruption.

Repair Work Item

NTFS will maintain a small number of work items on a global list to handle the case where allocations fail due to INSUFFICIENT-RESOURCES. The work items may have the following fields in the structure:

NotificationEvent—Used to signal any waiting thread that this repair work has been completed.

ReferenceCount—Indicates the number of reasons this work item is still present. This value is initially set to either 1 or 2. One reference is due to the repair work to be done by the worker thread. The other reference is set if there is a thread which is going to wait for the work item to be completed. The worker thread decrements the reference count after signaling the NotificationEvent above. The waiting thread if present will decrement this reference at the point where it is no longer waiting for the repair (either the repair completed or the waiting thread was cancelled). Whichever thread transitions the reference count to zero will be responsible for deleting the work item.

FileReference—This indicates which file is actually corrupt. A value of MAXULONGLONG indicates that this is not a file corruption being repaired. If the value is not MAXULONGLONG then the FCB for this file will have a reference to prevent it from leaving memory.

FileRecordReference—This indicates which file record is actually corrupt. A value of MAXULONGLONG indicates that there is no known corrupted file record.

AttributeOffset—This is the offset in the FileRecord above which is corrupt. A value of zero indicates that there is no known corrupted attribute. It doesn't mean that there isn't an attribute which needs to be checked though. For example NTFS has discovered that an attribute is missing.

AttributeTypeCode—Indicates the attribute type code which needs to be checked.

AttributeName—UNICODE string for the name of the attribute which needs to be checked.

NTSTATUS—Status indicating if the repair completed successfully.

IRP—This is an IRP which was issued by a user to initiate a repair operation. It can also be an IRP which was being processed at the time the corruption was detected. Information in the Flags field below will indicate which case this is. In the first case the IRP is completed after the repair completes. In the second case the IRP is retried after the repair completes. The only time this second case is utilized is if NTFS has already returned STATUS PENDING to a user, the IRP will have to be posted to the ExWorkerThread in this case. NTFS will serialize with the cancel IRP spinlock to complete this provided it hasn't been cancelled by user action.

Flags—Indicating more details about the repair to do. Also indicates whether the IRP (if present) is for notification or is to be reissued. A notification Irp is issued by a user to initiate a scan.

LIST-ENTRY—Global queue of work items.

RelatedWorkItem—If present indicates that this work item can be completed once the RelatedWorkItem is completed. The RelatadWorkItem is created as a result of corruption found while processing this work item.

SequenceNumber—Number associated with this work item. Used to dateline whether a corruption is found is discovered after a repair has been completed.

Non-Fatal Corruptions

In some cases NTFS will discover corruptions but doesn't need to defer the completion of the current request until a repair is complete. In this case NTFS will generate a work item to post to the top level but can continue processing the current request. This would be cases where there is a strategy to work around the corruption while the repair takes place. If the work around can be initiated in-line then the current request can continue after attaching the repair work item to the top level IRP-CONTEXT. An example here is a corrupt security descriptor. The repair Item can be generated but the current request will use the SYSTEM/ADMIN descriptor for the current file until the repair is complete.

In-Place Repair

Some repairs don't require posting a work item to the top-level thread. Some repairs can be done within the currently running operation. For example if NTFS is freeing a bit in the volume $BITMAP and discovers the bit is already clear then there isn't any need to post the work. The initial version of self-healing NTFS will favor a simple model over optimizations so may choose to post even if the repair could be done in-line.

User Initiated Repair

NTFS will generate a work item which is queued to a worker thread to do the actual work. The user request and user thread here will use the same waiting technique as for an ordinary user request which interacts with a repair operation.

Open by FileID Handles

In order to find all handles (and CCBs) for an open file we will need to also find those which have been opened by FileID or ObjectID. The CCBs are queued off of the SCB which supports the open. NTFS will walk the CCBs for a particular stream or all of the streams for a particular file looking for CCBs to invalidate.

Testing Considerations

How to generate corruptions online.
How to validate repairs.
How to provoke Ntfs to discover corruptions.
Verify Usn and DirNotify notifications.
Verify Fsctls.
Verify handle behavior after repair.
Generate boot corruptions.
Verify wait and cancel behavior while repairs are running.
Possible repair mode for testing where no repair is done but the corruption found during a scan is reported. This will give a chance for testing to confirm that NTFS is finding the corruptions.

Concurrent Repair Operations

NTFS may discover corruptions simultaneously in separate threads. The initial version of self-healing NTFS will post the repairs to a single work queue and process them in a dedicated thread spawned as needed. Future versions of self-healing NTFS may allow these repair operations to run in separate threads, specifically the thread running on behalf of a user at the time the corruption was detected. This strategy is appropriate only for repairs with limited scope. It is sensible to post long running repair operations to a dedicated thread as the user may cancel his request or want to kill the thread associated with an application yet the repair operation really needs to run to completion.

The routines which process the repair work queue and work items will be designed with the intent to allow concurrent repairs in some future version.

Types of Corruption and Associated Repair File Attributes

Attribute missing
Attribute list is corrupt.
Attribute offset is out of bounds.
Attribute record length=0.
Attribute table is corrupt??
Attribute VCN is negative.
Attribute→RecordLength=0.
AttributeList is corrupt.
Corrupt attribute: bad VCN range, vcn to lookup is out of range.
Corrupt filename attribute, file name links are bad, or directory is missing the $INDEX-ROOT.
FILE-ATTRIBUTE-REPARSE-POINT flag is not set.
Filename attribute is missing.
Indexed attribute already exists.
IndexEntry is invalid (corrupt attribute).
MFT data attribute is missing.
Missing entry in the open attribute table.
Non-indexed attribute already exists.
Non-resident $DATA attribute is missing.
Non-resident attribute already exists.
Resident attribute data exceeded record length.
The $STANDARD-INFORMATION attribute is missing.

Allocations

Not enough allocation for file record.
Allocation corruption
Could not find the allocation.
VCN is bad.
VCN too large.
Zero LCN.
Trying to access data beyond the allocation.
Trying to set LCN 0 free.
LCN is in use.
Non-resident AllocatedLength too large.

Indexes

Corrupt index tree.
Could not find index entry. Empty Index.
Empty index entry leaf.
Index buffer is corrupt.
Index entry already exists.
Index entry does not exist.
Index entry is corrupt.
Name index is invalid.
Record index too large.

Record not found in the reparse point Index.
Zero length index entry length.

UpCase Table

Upcase table too large.
Could not access the upcase table.

Log File

Invalid log record. Log file is full.

Restart

Invalid restart index.
Invalid restart table.
Unallocated restart table entry.

Security

Corrupt security id.

File Corruption

File record corruption.
FILE signature is corrupt.
Filesize is larger than the allocation.
Filesize is too large for a reparse point.
Bad file records?
Invalid FileSize, ValidDataLength, or AllocationSize
Non-resident FileSize is too large for a reparse point.
Non-sparse file with un-allocated range.
RecordOffset beyond FRS size.
The file is corrupt if there are 0 or more than 8 Vcn change bytes, more than 8 Lcn change bytes, or if we would walk off the end of the record, or a Vcn change is negative.
MCB does not exist.
MCB is corrupt.
Unexpected file reference.

Failed Abort

Walk through exclusive FCB list (and bitmap flag) to determine what needs to be repaired.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
    defining categories of corruption:
        i) a corruption associated with a file system request;
        ii) a corruption associated with user operation; and
        iii) a corruption associated with an invalid handle due to previous repair;
    detecting a corruption to data on a storage volume, the corruption falling into one of the categories;
    defining a long-running repair scan that corresponds to the corruption detected if the corruption is associated with user operation;
    implementing the repair scan.

2. A method as recited in claim 1, further comprising:
    raising an error status indicating the corruption, the error status initiating the suspending; and
    recording information describing the corruption at the time of the detecting, the repair scan being defined based on the information.

3. A method as recited in claim 1, wherein the defining a repair scan comprises defining a complex repair scan that includes a collection of lower level scans.

4. A method as recited in claim 3, wherein the implementing the repair scan comprises implementing the complex repair scan.

5. A method as recited in claim 4, wherein the implementing the complex repair scan comprises implementing the collection of lower level scans.

6. A method as recited in claim 1, wherein the implementing the repair scan comprises running a repair routine at a top-level point of execution within a current thread.

7. A method as recited in claim 1, wherein the implementing the repair scan comprises initiating a dedicated thread to service the repair scan.

8. A method as recited in claim 1, wherein the file system request is a recursive request, the method further comprising:
    unwinding to a top level request of the recursive request; and
    implementing the repair scan with respect to the top level request.

9. A method as recited in claim 1, wherein the repair scan is selected from the group consisting of:
    an attribute scan;
    a file scan;
    an index scan;
    a volume bitmap rebuild; and
    a security descriptor file scan.

10. A method as recited in claim 1, further comprising:
    receiving a second file system request associated with a file that is subject to the repair scan;
    failing the second file system request if the repair scan is a long-running repair; and
    blocking the second file system request until the repair scan is completed if the repair scan is a short-running repair.

11. A method as recited in claim 1, further comprising:
    receiving a file system control command to disable the repair scan; and
    disabling the repair scan if the repair scan is a long-running repair.

12. A method as recited in claim 1, further comprising:
    detecting an additional corruption while implementing the repair scan; and
    postponing the repair scan until a new repair scan is completed.

13. A method as recited in claim 1, further comprising:
    detecting an intermittent hardware error while implementing the repair scan;
    failing the repair scan because of the intermittent hardware error; and
    logging the failed repair scan to an event log.

14. A method as recited in claim 1, further comprising initiating a validation scan on file system meta-data during the repair scan.

15. A method as recited in claim 14, wherein the initiating a validation scan comprises initiating a validation scan selected from the group consisting of:
    a full volume scan;
    a security scan;
    a file scan;
    a stream scan;

a directory scan; and a view index scan.

16. A processor-readable storage medium comprising processor-executable instructions configured for performing the method of claim 1.

17. A method as recited in claim 1, wherein defining the non-trivial repair scan further comprises:

suspending execution of the file system request based on the corruption;

failing the file system request; and issuing a corrupt status error.

18. A processor-readable storage medium having processor-executable instructions embodied thereon, the processor-executable instructions configured for:

defining categories of corruption:
i) a corruption associated with a file system request;
ii) a corruption associated with user operation; and
iii) a corruption associated with an invalid handle due to previous repair;

detecting a data corruption on a storage volume, the corruption falling into one of the categories;

defining a long-running repair scan that corresponds to the corruption detected if the corruption is associated with user operation;

implementing the repair scan.

19. A processor-readable storage medium as recited in claim 18, comprising further processor-executable instructions configured for permitting a user to cancel the file system request while the data corruption is being repaired.

20. A computer comprising the processor-readable storage medium recited in claim 18.

21. A computer comprising:

a hard disk having one or more volumes configured thereon; and a file system configured to perform acts comprising:

defining categories of corruption:
i) a corruption associated with a file system request;
ii) a corruption associated with user operation; and
iii) a corruption associated with an invalid handle due to previous repair;

detecting a corruption to data contained in the one or more volumes associated with a file system request, the corruption falling into one of the categories;

defining a long-running repair scan that corresponds to the corruption detected if the corruption is associated with user operation;

implementing the repair scan.

22. A computer as recited in claim 21, further comprising:

a real-time repair module integrated within the file system, the file system configured to call the real-time repair module upon detecting the corrupted meta-data, the real-time repair module configured to repair the corrupted meta-data in response to the call from the file system.

23. A computer as recited in claim 21, further comprising:

an application program configured to make a request of the file system and manage a suspension of the request by the file system until the real-time repair is completed and the file system implements the request.

24. A computer as recited in claim 21, wherein defining the non-trivial repair scan further comprises:

suspending execution of the file system request based on the corruption;

failing the file system request; and issuing a corrupt status error.

* * * * *